United States Patent
Creasey

(10) Patent No.: US 8,298,998 B2
(45) Date of Patent: Oct. 30, 2012

(54) STUCK DRILL PIPE ADDITIVE AND METHOD

(75) Inventor: David H. Creasey, Boerne, TX (US)

(73) Assignee: Contact Marketing Solutions, LLS, Danbury, CT (US)

( * ) Notice: Subject to any disclaimer, the term of this patent is extended or adjusted under 35 U.S.C. 154(b) by 427 days.

(21) Appl. No.: 12/305,807

(22) PCT Filed: Oct. 11, 2006

(86) PCT No.: PCT/US2006/039612
§ 371 (c)(1),
(2), (4) Date: Dec. 19, 2008

(87) PCT Pub. No.: WO2007/149112
PCT Pub. Date: Dec. 27, 2007

(65) Prior Publication Data
US 2010/0167961 A1   Jul. 1, 2010

Related U.S. Application Data

(60) Provisional application No. 60/815,501, filed on Jun. 21, 2006.

(51) Int. Cl.
*C09K 8/74* (2006.01)
(52) U.S. Cl. .................................. 507/269; 166/305.1
(58) Field of Classification Search .................. 507/269; 166/305.1
See application file for complete search history.

(56) References Cited

U.S. PATENT DOCUMENTS

| | | | |
|---|---|---|---|
| 4,436,638 A | 3/1984 | Walker | |
| 4,464,269 A | 8/1984 | Walker | |
| 4,466,486 A * | 8/1984 | Walker | 166/301 |
| 4,494,610 A | 1/1985 | Walker | |
| 4,614,235 A | 9/1986 | Keener | |
| 5,247,992 A * | 9/1993 | Lockhart | 166/301 |
| 5,555,937 A | 9/1996 | Fisk, Jr. et al. | |
| 5,989,595 A * | 11/1999 | Cummins | 424/710 |
| 7,012,043 B2 | 3/2006 | Klein | |
| 7,033,976 B2 | 4/2006 | Guzman | |
| 2001/0009889 A1* | 7/2001 | Waggenspack et al. | 507/110 |
| 2006/0073986 A1* | 4/2006 | Jones et al. | 507/129 |

OTHER PUBLICATIONS

G.P. Putnam's Sons, "The Oxford American College Dictionary", Copyright 2002, Oxford University Press, Inc., p. 172.

* cited by examiner

*Primary Examiner* — Alicia Toscano
(74) *Attorney, Agent, or Firm* — McCarter & English

(57) ABSTRACT

An aqueous mixture of a non-toxic, low pH, antimicrobial, acidic composition having a pH between approximately 0.5 and approximately 3.5 is used in a drilling fluid and a stuck pipe additive. One embodiment of the stuck pipe additive composition includes an alkali metal halide salt in a range of approximately 10-35 weight %; a sequenching agent in a range between 2-8 weight %, a low pH, non-toxic acid composition in a range of 0.5-20 weight percent and water in a range of 7-88.5 weight %. As a drilling fluid, it maintains well control and removes drill cuttings from holes drilled into the earth. As a spotting fluid, it frees a stuck drill stem in the annulus of a bore hole in minutes.

16 Claims, 2 Drawing Sheets ized from fatty acids and alcohols), ethers, usually synthesized from alcohols (U.S. Pat. No. 4,614,235 to Keener et al.), polyalphaolefins (manufactured by the catalytic polymerization of linear alpha-olefins), olefin isomers (manufactured by selective isomerization of normal alpha-olefins) and other base compounds are reported.

STUCK DRILL PIPE ADDITIVE AND METHOD

This invention claims the benefit of priority from U.S. Provisional Patent Application 60/815,501 filed Jun. 21, 2006.

FIELD OF THE INVENTION

This invention relates to a process and composition effective in the release of stuck pipe in a borehole during a drilling operation, more specifically, to a drilling fluid additive to a water based mud system that is environmentally safe and effective in removing drill cuttings and breaking up a mud or filter cake that is deposited on the well bore face against which the drill stem or string becomes stuck.

BACKGROUND AND PRIOR ART

When drilling through subterranean and geological formations, specialized drilling fluids, referred to as "muds," are used to help maintain well control and to remove drill cuttings from the hole. The drilling pipe or string can become stuck in the hole, causing catastrophic delays in drilling, significant loss of time and money. There are a number of causes which may contribute to the stuck drill pipe problem including hole cave-in, blow-outs, mud or filter cake buildup in the bore hole. It is essential to free the stuck drill pipe as quickly as possible, with the least amount of down time and the least amount of damage to equipment, the environment and the operators.

Historically, either water-based muds (WBMs) or oil-based muds (OBMs) have been used for offshore wells. Recently, in response to U.S. Environmental Protection Agency (EPA) regulations and drilling-waste discharge requirements imposed by North Sea nations, the drilling industry has developed several types of synthetic-based muds (SBMs) that combine the desirable operating qualities of OBMs with the lower toxicity and environmental impact qualities of WBMs.

Each drilling fluid has positive and negative features. For example, on the positive side, water-based muds (WBMs) do not release free oil, are usually without toxic contaminants such as cadmium and mercury, are typically discharged at the well site and are widely used in shallow wells and in shallower portions of deeper wells; however, on the negative side, in deep or extended-reach wells, the performance of WBMs is often poor. Thus, for deep well intervals and complex drilling situations, oil-based muds (OBMs) and synthetic-based muds (SBMs) are needed for their superior performance.

The problem with OBMs is that U.S. Environmental Protection Agency (EPA) guidelines prohibit release of free oil, as detected by the static sheen test, from drilling fluids and drill cuttings discharges. Thus, OBMs must be recycled and cannot be discharged on-site, so there is the added cost of hauling and disposing of wastes onshore and long-term liability concerns associated with onshore disposal sites. OBMs also pose greater risk to workers through skin irritation and the effects of inhalation. Thus, despite their unique and valuable properties widespread use of OBMs is severely limited.

With regard to synthetic-based muds (SMBs), the synthetic liquid forms the continuous phase, while brine serves as the dispersed phase. The synthetic based fluids are classified according to the molecular structure as, esters (synthesized from fatty acids and alcohols), ethers, usually synthesized from alcohols (U.S. Pat. No. 4,614,235 to Keener et al.), polyalphaolefins (manufactured by the catalytic polymerization of linear alpha-olefins), olefin isomers (manufactured by selective isomerization of normal alpha-olefins) and other base compounds are reported.

An oil-based stuck pipe additive containing propoxylated $C_{18}$-$C_{32}$ alkanols, an oil-soluble emulsifier-wetting agent and if desired an imidazoline for high temperature emulsion stability is reported in U.S. Pat. No. 4,436,638 and U.S. Pat. No. 4,464,269 to Walker et al.

SBMs have a wide range of chemical properties, drilling performance and environmental impacts, advantages and disadvantages for drilling operations and disposal of cuttings. For example, SBMs have drilling and operational properties similar to OBM systems and are used where OBMs are commonly used in difficult drilling situations, such as, high downhole temperatures, hydratable shales or salt, where the properties of WMBs would limit performance. Experience has shown that SBMs have higher cost, superior drilling performance and lower environmental to impact than OBMs. SBMs must be recycled, with only the cuttings and a small amount of associated drilling fluids being disposed of on-site, if EPA and other environmental regulations will permit. Since 1990, several low-toxicity, biodegradable SBMs have entered the market. However, restrictions on discharge of cuttings may pose a barrier to their use.

U.S. Pat. No. 5,247,992 to Lockhart describes a fluid for releasing stuck drill pipe that contains one or more carboxylic acids with specific chemical and physical properties.

In U.S. Pat. No. 7,033,976 B2 to Guzman a fluid system additive for use in hydrocarbon exploitation used a biopolymer derived from at least one species of the banana family that allegedly reduces the costs and environmental effects of existing additives.

Nonetheless, a drilling mud or stuck pipe additive is still needed by the drilling industry that provides superior drilling performance, low environmental impact, no release of oil, reasonable cost, and no toxicity to man or the environment.

The present invention fulfills many of the needed attributes of a stuck pipe additive and provides a fluid system additive that supports and improves the efficiency of a water-based mud (WBM) system for the drilling industry.

SUMMARY OF THE INVENTION

The first objective of the present invention is to provide a stuck pipe additive that provides superior subterranean drilling performance.

The second objective of the present invention is to provide a stuck pipe additive that is non-toxic to the environment.

The third objective of the present invention is to provide a stuck pipe additive to with low environmental impact.

The fourth objective of the present invention is to provide a stuck pipe additive that is used as a spotting fluid to free a stuck drill stem in the annulus of a bore hole.

The fifth objective of the present invention is to provide a stuck pipe additive that permits drill cuttings and associated drilling fluids to be disposed of on-site.

The sixth objective of the present invention is to provide a stuck pipe additive that meets national and local regulatory guidelines imposed on the drilling industry.

The seventh objective of the present invention is to provide a stuck pipe additive that is non-toxic to humans and marine life.

The preferred stuck pipe additive of the present invention is composed of a low pH acidic antimicrobial composition that is mixed with water to form an aqueous solution. The mixing ratio of water to low pH acid is in a range between approximately 3 millimeters (ml) to approximately 20 ml of low pH acid per gallon of water.

A preferred spotting fluid for releasing stuck drill pipe includes an aqueous based continuous phase that has the characteristics of brine, and a non-toxic, low pH acidic composition with antimicrobial properties.

The more preferred spotting fluid contains a non-toxic, low pH acidic composition prepared by the process of combining a high purity inorganic acid with water and an ammonium compound; heating the mixture to approximately 140° F. to form mixture (I), placing mixture (I) in a pressurized vessel and heating the mixture, under pressure, to temperatures in a range between approximately 200 F and 400 F, then, cooling the mixture, after the mixture is cooled, adding a stabilizing amount of the starting mixture (I).

It is also preferred that the spotting fluid include brine and/or sea water as an aqueous based continuous phase. The preferred mixing ratio of sea water to low pH acidic composition is in a range between approximately 3 milliliters to approximately 20 ml of low pH acid to one gallon of sea water. The sea water solution of low pH acidic composition is then used as a drilling fluid that is pumped to the bottom of the drill pipe during the drilling operation.

The preferred spotting fluid includes a low pH acidic composition (LpHAC) prepared using a high purity acid such as, sulfuric acid, phosphoric acid, fumaric acid and acetic acid; an ammonium compound such as, anhydrous ammonia, ammonium sulfate and buffered ammonium nitrate or a metallic sulfate can be used instead of the ammonium compound. The preferred metallic sulfate is at least one of sodium sulfate, magnesium sulfate, zinc sulfate, manganese sulfate, and copper sulfate.

A preferred stuck pipe additive composition for releasing stuck drill pipe in subterranean drilling includes an aqueous based continuous phase, a non-toxic, low pH acidic composition with antimicrobial properties, an alkali metal halide salt that functions as a dehydrating agent, and a sequencing agent that functions to prevent the rebinding of the subterranean drillings.

The preferred stuck pipe additive contains a non-toxic, low pH acidic composition prepared by combining a high purity inorganic acid with water and an ammonium compound, heating the mixture to approximately 140° F. to form mixture (I), placing mixture (I) in a pressurized vessel and heating the mixture, under pressure, to temperatures in a range between approximately 200 F and 400 F, then, cooling the mixture, after the mixture is cooled, adding a stabilizing amount of the starting mixture (I).

It is more preferred that the stuck pipe additive have an aqueous based continuous phase that is at least one of brine and sea water. The preferred mixing ratio of sea water to low pH acidic composition is in a range between approximately 3 milliliters to approximately 20 ml of low pH acid to one gallon of sea water. The sea water solution of low pH acidic composition is then used as a drilling fluid that is pumped to the bottom of the drill pipe during the drilling operation.

The preferred stuck pipe additive includes a low pH acidic composition (LpHAC) prepared using a high purity acid such as, sulfuric acid, phosphoric acid, fumaric acid and acetic acid; an ammonium compound such as, anhydrous ammonia, ammonium sulfate and buffered ammonium nitrate or a metallic sulfate can be used instead of the ammonium compound. The preferred metallic sulfate is at least one of sodium sulfate, magnesium sulfate, zinc sulfate, manganese sulfate, and copper sulfate.

The preferred stuck pipe additive also contains an alkali metal halide salt that functions as a dehydrating agent, and a sequencing agent that functions to prevent the rebinding of the subterranean drillings. The alkali metal halide salt is at least one of potassium chloride, sodium chloride and magnesium chloride. The sequencing agent is at least one of sodium acid pyrophosphate and calcium acid pyrophosphate.

A preferred method for releasing a stuck drill pipe includes contacting the interval of a borehole in which a drill string has become stuck due to the formation of a wall cake with a spotting fluid containing an effective amount of a low pH acidic composition with antimicrobial properties, allowing a time interval of from approximately 5 minutes to approximately 1 hour for the spotting fluid to break down the wall cake, and releasing the stuck drill string.

In the preferred method for releasing a stuck drill pipe, a preferred step includes contacting a wall cake with a composition containing a low pH acidic composition prepared by the process of combining a high purity inorganic acid with water and an ammonium compound, heating the mixture to approximately 140° F. to form mixture (I), placing mixture (I) in a pressurized vessel and heating the mixture, under pressure, to temperatures in a range between approximately 200 F and 400 F, then, cooling the mixture, after the mixture is cooled, adding a stabilizing amount of the starting mixture (I).

A preferred method for improving drilling operations includes drilling through earth using a drill rig comprising a hollow drill pipe and injecting into the hollow drill pipe a drilling fluid comprising LpHAC. A more preferred method includes using the drilling fluid containing an aqueous based continuous phase.

A more preferred drilling fluid includes LpHAC and a viscosifier selected from at least one of a gum, a gypsum and a gel.

Further objects and advantages of this invention will be apparent from the following detailed description of a presently preferred embodiment, which is illustrated in the accompanying drawings.

DESCRIPTION OF THE PREFERRED EMBODIMENT

Figure 1:
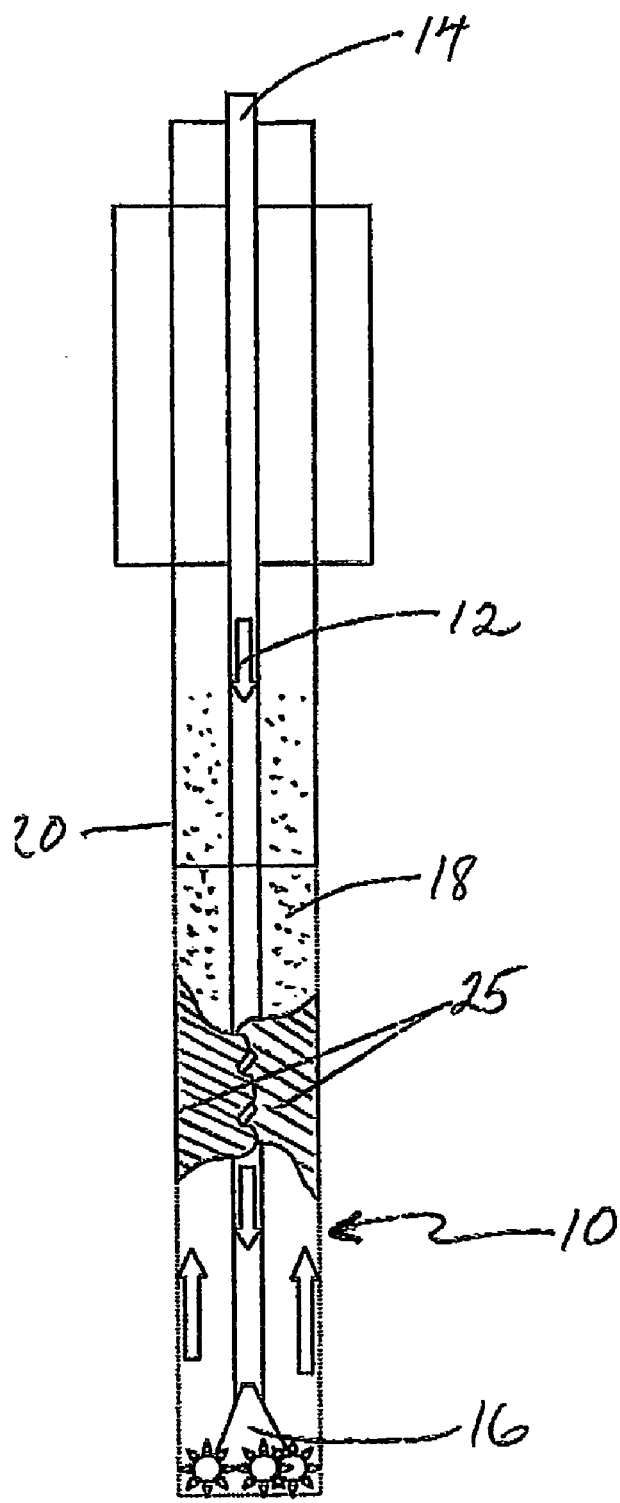
FIG. 1 is a schematic illustration of the LpHAC being used as a spotting fluid to release a stuck pipe caused by discharge mud forming a cake in the annulus of the bore hole.

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

It would be useful to discuss the meanings of some words used herein and their applications before discussing the compositions of matter and method of using and making a drilling mud additive therefrom.

"Annulus" is the space within a bore hole between the drill string and the well wall through which mud and drill cutting travel upward to the surface.

"Drilling fluid" or "drilling mud" are used interchangeably herein to refer to fluids used to minimize problems associated with filter cake formations when drilling through subterranean and geological formations.

"LpHAC" is used to refer to a low pH acidic composition as described herein and as described and/or claimed in U.S. Pat. No. 5,989,595 or U.S. Pat. No. 6,242,011 B1 to Cummins, both of which are incorporated herein by reference.

In U.S. Pat. Nos. 5,989,595 and 6,242,011 B1 to Cummins, a low pH acidic composition of matter is disclosed that is useful for destroying microorganisms that spoil food, such as fish. The composition of matter, patented by Cummins, is also useful for skin treatment of melanoma and the treatment of other bacteria, and serves as a component of the drilling fluids and stuck pipe additives disclosed herein.

In general, the process for preparing a LpHAC that is not an irritant or deleterious to humans includes combining a strong, low pH acid, selected from at least one of, 98% purity sulfuric acid, phosphoric acid, fumaric acid or acetic acid with water, preferably distilled water, deionized water, filtered water or the like and an ammonium compound or urea to provide mixture (I), combining mixture (I) in a pressurized vessel and heating the mixture to temperatures in a range between approximately 200 F and approximately 800 F, then cooling the mixture. After the mixture is cooled, a stabilizing amount of the starting mixture (I) is added. Further detail describing the creation of LpHAC compounds is provided in the Cummins patents referenced above.

The ammonium compound is preferably anhydrous ammonia, ammonium sulfate, and buffered ammonium nitrate used in a ratio of approximately 1 lb. to approximately 5 lbs. of ammonium compound per gallon of water in mixture (I). A metallic sulfate, such as sodium sulfate, magnesium sulfate, zinc sulfate, manganese sulfate, and copper sulfate can be substituted for the ammonium compound in the process for making the LpHAC used herein as the key ingredient in a stuck pipe additive, drilling mud or spotting fluid. The LpHAC prepared by the process above behaves as a buffered acid in this application.

The following physical and chemical properties of one embodiment of the LpHAC used in the present invention are observed when undiluted.

pH=−3; color is clear; specific gravity is between approximately 1.45 and approximately 1.53.

In one embodiment of the disclosed drilling agents, the LpHAC can be incorporated into an aqueous based fluid in an amount ranging from approximately 4.0 milliliters (ml) to approximately 10 ml, preferably approximately 6.8 ml per gallon of aqueous based fluid. The formulation may also include optional viscosifying agents needed to make the drilling mud formulation compatible with solids weighting material to keep solids in suspension. The viscosifier is present in a range from approximately 5 weight percent to approximately 20 weight percent of the total solution, based on the selection of viscosifier and conditions in the bore hole.

A suitable viscosifier may also be to the stuck pipe fluid compositions of the present invention to thicken, stabilize and form a slurry of the suspended solids. Any suitable viscosifier may be used. Preferably, the viscosifier is a non-toxic, organic material such as a gum, gypsum, a gel and the like.

The aqueous based continuous phase component of the drilling fluid of the present invention may generally be any water based fluid phase that is suitable for use in a drilling fluid. Preferably, the aqueous based continuous phase is selected from the group comprising fresh water, sea water, brine, mixtures of water and non-toxic water soluble organic compounds, or mixtures thereof. The amount of the aqueous based continuous phase component in the drilling fluid of the present invention will vary, depending on the drilling application and the nature of the conditions in the subterranean bore hole. Typically, the amount of the aqueous based continuous phase may range from nearly 100% of the drilling fluid to less than approximately 20% of the drilling fluid by volume.

As a drilling mud additive, an aqueous solution of LpHAC functions to breakdown a wall cake deposited on the well bore face and brings cuttings to the surface for disposal while stabilizing the bore hole. Downtime for stuck pipe may be drastically reduced and neither workers nor the environment are harmed by use of the stuck pipe additive of the present invention.

During the drilling of a subterranean well 10, a drilling fluid or "mud" 12 is pumped to the bottom of the well through the hollow drill pipe 12 as illustrated in FIG. 1. The drilling mud 12 cools the rotating drill bit 16 and serves to transport the rock or drill cuttings 18 to the top of the well through the annulus between the drill pipe and the borehole wall 20. An appropriate drilling fluid is also useful in maintaining the pressure balance between geological formations and the bore hole, lubricating the bit and drill string, reducing friction in the bore hole, sealing permeable formations.

Under most conditions drill cuttings 18 can also form a filter cake 25 on the walls of the bore hole, particularly in more permeable rock formations, such as limestone. The filter cake 25 hardens and becomes packed around the well bore. In a water-based mud (WBM) system the drill stem 14 has less ability to handle increased mud weights which allows high cutting solid removal, and higher drag on the drill stem leads to lost circulation. Lost circulation is a condition where drill cuttings 18 are not brought to the surface for removal and mud flow 12 is stopped. When the cuttings 18 pack around the drill stem 14, the drill stem 14 cannot be removed from the pipe and the drilling operation must cease until the stuck pipe is released, as shown in FIG. 1.

Use of a spotting fluid such as the stuck pipe additive composition disclosed herein is necessary to clear up the lost circulation condition resulting from the fitter cake build up.

Figure 2A:
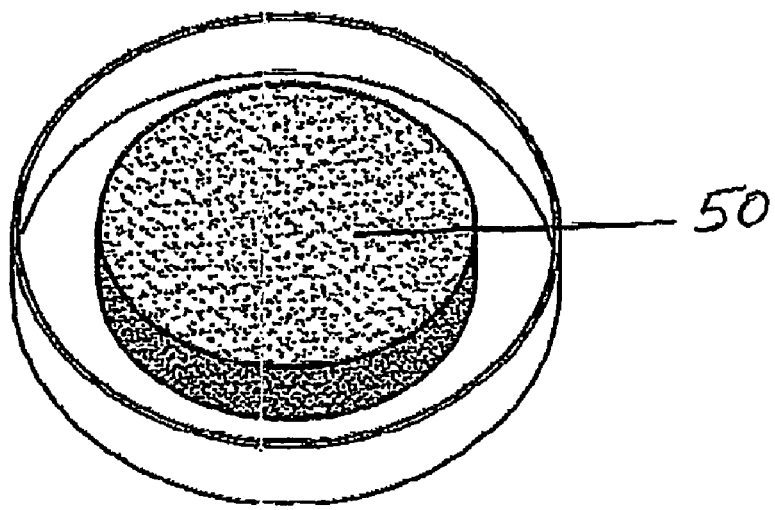
FIG. 2A shows mud discharge collected from a bore hole pressed into a solid filter cake at time zero, under ambient conditions.

FIG. 2A shows a compressed cake 50 of 13.7 pound per gallon filter cake mud taken from a drill hole and placed in a laboratory Petri dish at ambient conditions. Prior to being compressed, the 13.7 pound per gallon filter cake has the consistency of a thick peanut butter, with a viscosity of approximately 250,000 centipoise (cP) at 20° C. The cake 50 is compressed to remove most of the liquid to simulate a filter cake of drill cuttings that pack around the drill stem such that the drill stem cannot be removed from the pipe during a drilling operation, as in a stuck pipe situation.

A stuck pipe additive comprising a mixture of 22 weight % of potassium chloride (KCl), 4 weight % sodium acid pyrophosphate (SAPP), 10 weight % of a low pH acid product (such as LpHAC) and 64 weight % water is added to the Petri dish in FIG. 2A.

Figure 2B:
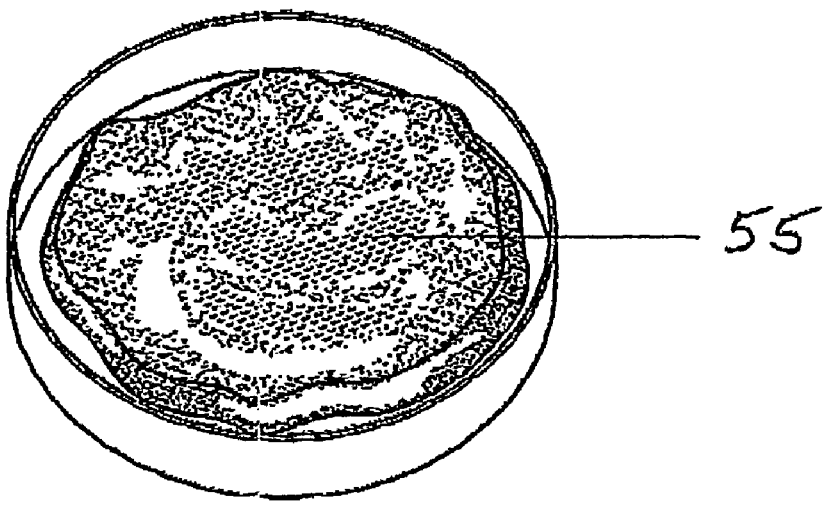
FIG. 2B shows the filter cake of FIG. 2A, approximately 4 minutes after treatment with the LpHAC spotting fluid composition of the present invention, under ambient conditions.

FIG. 2B shows the compressed cake 50 after approximately 4 minutes of exposure, in stagnant conditions, to the preferred stuck pipe additive of the present invention. The cake 55 has a much softer consistency and is broken apart into small flakes by the stuck pipe additive composition. The cake 55 now resembles the consistency of a soft and slightly runny composition, such as, ketchup with a viscosity of approximately 50,000 centipoise (cP) at 20° C.

Figure 2C:
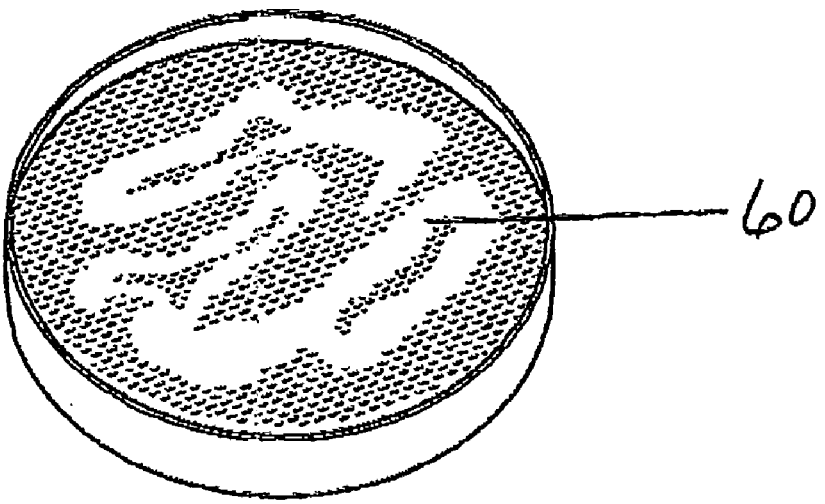
FIG. 2C show the filter cake of FIG. 2A, approximately 9 minutes after treatment with the LpHAC spotting fluid composition of the present invention, under ambient conditions.

FIG. 2C shows the dramatic change in rheology of the filter cake 60 after approximately 9 minutes, when the consistency is that of a very light weight liquid such as a light machine oil with a viscosity of 102 centipoise (cP) at 20° C.

Thus, FIGS. 2A-2C illustrate the efficacy of the stuck pipe additive of the present invention in a stagnant condition at ambient temperatures. The compressed filter cake changes from a well-formed mass that causes a stuck pipe to a liquid material that releases or no longer binds a stuck pipe, in less than ten minutes under ambient conditions. The stuck pipe additive of the present invention comprises an alkali metal halide dehydrating agent, such as potassium chloride, sodium chloride or magnesium chloride that breaks the filter cake into small flakes and a sequenching agent, such as, sodium acid pyrophosphate (SAPP) prevents rebinding.

In field tests, it is demonstrated that the stuck pipe additive of the present invention performs even better in down hole conditions because of entrained carbonates from the drill cuttings that facilitate the break-up of the hardened filter cake.

Example 1

Stuck Pipe Additive Composition

| Compound | Weight Percent Range | Preferred Weight Percent |
|---|---|---|
| Potassium chloride (KCl) | 10-35 | 22 |
| Sodium Acid pyrophosphate (SAPP) | 1-8 | 4 |
| Low pH acid product (LpHAC) | 0.5-50 | 10 |
| Water | 88.5-7 | 64 |

Based on laboratory tests using a variety of stuck pipe additive compositions, it is demonstrated that in less than approximately 10 minutes to less than approximately 2 hours, stuck pipe conditions can be eliminated, thus reducing overall drilling costs by decreasing downtime and other non-productive activities.

Example 2

Use of Stuck Pine Additive as Spotting Fluid

The drill pipe can become stuck due to collapsed formation or lost circulation of cuttings as shown in FIG. 1, making rotation or removal of the drill pipe difficult or impossible. The drill stem becomes packed in the filter cake and can't go up or down causing a shut down of all operations. When this happens, chemicals known as spotting fluids can be pumped down the drill pipe into the drill stem to free the stuck pipe from the plug.

The stuck pipe additive composition of the present invention can effectively release the pipe from the particular filter cake that has resulted from the specific combination of mud types and rock formations in a bore hole. The formations are primarily carbonates from limestone, gypsum and the like. The carbonates are pH sensitive and when contacted with an acid, will crumble or break; the acid reacts with the carbonate in an effervescent manner, similar to an Alka-Seltzer® tablet dissolving in water.

A spotting fluid composed of approximately 1 part to 90 parts LpHAC and 10 parts to 99 parts water (brine) is directed down the drill stem until the spotting fluid comes in contact with and saturates the plug.

Discharged material can be neutralized with sodium hydroxide or sodium bicarbonate to a neutral pH of approximately 6.5 to approximately 7.0, and then discarded on site.

The spotting fluid or the stuck pipe additive composition of the present invention is useful in clearing plugs and blockage that shut down subterranean drilling operations in a matter of a few minutes or a few hours, thus limiting a major source of productivity losses. Whether as a spotting fluid or a stuck pipe additive composition, the composition of the present invention is also non-toxic to the environment and personnel involved in the drilling operations, as such, the drill cuttings and discharges can be disposed of on site, and will not harm marine life, if the release of cuttings is in a marine environment.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A spotting fluid for releasing stuck drill pipe, comprising (a) an aqueous based continuous phase that has the characteristics of brine; and (b) a non-toxic, low pH acidic composition with antimicrobial properties prepared by the process of combining a high purity inorganic acid with water and a metallic sulfate compound, heating the mixture to approximately 140° F. to form mixture (I), placing mixture (I) in a pressurized vessel and heating the mixture, under pressure, to temperatures in a range between approximately 200° F. and 400° F., cooling the mixture, and adding a stabilizing amount of the starting mixture (I) to the cooled mixture, wherein the pH of the spotting fluid is less than 6.5.

2. The spotting fluid of claim 1, wherein the aqueous based continuous phase is brine.

3. The spotting fluid of claim 1, wherein the aqueous based continuous phase is sea water.

4. The spotting fluid of claim 3, wherein the mixing ratio of sea water to low pH acidic composition is in a range between approximately 3 ml to approximately 20 ml of low pH acid to one gallon of sea water.

5. The spotting fluid of claim 1, wherein the high purity acid is selected from the group consisting of sulfuric acid, phosphoric acid, fumaric acid and acetic acid.

6. The spotting fluid of claim 1, wherein the metallic sulfate is selected from the group consisting of sodium sulfate, magnesium sulfide, zinc sulfate, manganese sulfate, and copper sulfate.

7. A stuck pipe additive composition for releasing a stuck drill pipe in subterranean drilling, comprising the spotting fluid of claim 1, an alkali metal halide salt, and at least one of sodium acid pyrophosphate and calcium acid pyrophosphate.

8. The stuck pipe additive composition of claim 7, wherein the aqueous based continuous phase is at least one of brine and sea water.

9. The stuck pipe additive composition of claim 8, wherein the mixing ratio of sea water to low pH acidic composition is in a range between approximately 3 ml to approximately 20 ml of low pH acid to one gallon of sea water.

10. The stuck pipe additive composition of claim 7, wherein the high purity acid is selected from the group consisting of sulfuric acid, phosphoric acid, fumaric acid and acetic acid.

11. The stuck pipe additive composition of claim 7, wherein the metallic sulfate is selected from the group consisting of sodium sulfate, magnesium sulfate, zinc sulfate, manganese sulfate, and copper sulfate.

12. The stuck pipe additive composition of claim 7, wherein the alkali metal halide salt is selected from potassium chloride, sodium chloride and magnesium chloride.

13. A method for releasing a stuck drill pipe, comprising contacting an interval of a borehole in which a drill string has become stuck due to the formation of a wall cake with the spotting fluid of claim 1; allowing a time interval of from approximately 5 minutes to approximately 1 hour for the spotting fluid to break down the wall cake; and releasing the stuck drill string.

14. A drilling fluid comprising the low pH acidic composition of claim 1 and a viscosifier selected from the group consisting of a gum, a gypsum and a gel.

15. A method for releasing a stuck drill pipe comprising contacting an interval of a borehole in which a drill string has become stuck with a spotting fluid comprising (a) an aqueous based continuous phase and (b) a low pH acidic composition prepared by the process of combining a high purity inorganic acid with water and an ammonium compound, heating the mixture to approximately 140° F. to form mixture (I), placing mixture (I) in a pressurized vessel and heating the mixture, under pressure, to temperatures in a range between approximately 200° F. and 400° F., then cooling the mixture, after the mixture is cooled adding a stabilizing amount of the starting mixture (I), wherein the pH of the spotting fluid is less than 6.5.

16. The method of claim 15, wherein the ammonium compound is selected from the group consisting of anhydrous ammonia, ammonium sulfate, and buffered ammonium nitrate.

\* \* \* \* \*